United States Patent
Oiwa

(10) Patent No.: US 9,697,419 B2
(45) Date of Patent: Jul. 4, 2017

(54) INFORMATION PROCESSING APPARATUS, NON-TRANSITORY STORAGE MEDIUM ENCODED WITH COMPUTER READABLE INFORMATION PROCESSING PROGRAM, INFORMATION PROCESSING SYSTEM, AND INFORMATION PROCESSING METHOD

(71) Applicant: NINTENDO CO., LTD., Kyoto-shi, Kyoto (JP)

(72) Inventor: Ryota Oiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/816,398

(22) Filed: Aug. 3, 2015

(65) Prior Publication Data
US 2016/0180542 A1    Jun. 23, 2016

(30) Foreign Application Priority Data
Dec. 19, 2014    (JP) ................................. 2014-257227

(51) Int. Cl.
*G06K 9/00* (2006.01)
(52) U.S. Cl.
CPC ..... *G06K 9/00362* (2013.01); *G06K 9/00355* (2013.01); *G06K 9/00389* (2013.01)

(58) Field of Classification Search
None
See application file for complete search history.

(56) References Cited

U.S. PATENT DOCUMENTS

| 2008/0304707 A1* | 12/2008 | Oi ..................... G06K 9/00664 |
| | | 382/103 |
| 2016/0133058 A1* | 5/2016 | Kaino .................. G06T 19/006 |
| | | 345/633 |

FOREIGN PATENT DOCUMENTS

WO    WO 2012/177322    12/2012

* cited by examiner

*Primary Examiner* — Delomia L Gilliard
(74) *Attorney, Agent, or Firm* — Nixon & Vanderhye PC

(57) ABSTRACT

A portable information processing apparatus according to one embodiment includes at least an image pick-up portion, a recognition module recognizing a detection target which includes a part of a user within an image obtained by the image pick-up portion and outputting change over time in position of recognition of the detection target, a processing module performing processing in accordance with change over time in position of recognition of the detection target, and a correction module correcting change over time in position of the detection target output by the recognition means in accordance with change in posture of the information processing apparatus.

8 Claims, 8 Drawing Sheets

INFORMATION PROCESSING APPARATUS, NON-TRANSITORY STORAGE MEDIUM ENCODED WITH COMPUTER READABLE INFORMATION PROCESSING PROGRAM, INFORMATION PROCESSING SYSTEM, AND INFORMATION PROCESSING METHOD

This nonprovisional application is based on Japanese Patent Application No. 2014-257227 filed with the Japan Patent Office on Dec. 19, 2014, the entire contents of which are hereby incorporated by reference.

FIELD

An embodiment relates to an information processing apparatus performing processing in accordance with a picked-up image, a non-transitory storage medium encoded with a computer readable information processing program, an information processing system, and an information processing method.

BACKGROUND AND SUMMARY

Such a technique has been disclosed that a gesture is used before a camera so as to expand a range of activities with real world within a field of view of the camera so that a user can enter the real world and augmented world at finer granularity and interact therewith.

This known method basically assumes such a form that a user holds a hand-held device with one hand and interacts with the hand-held device with his/her free hand.

When a user holds and operates a portable information processing apparatus, the information processing apparatus cannot be fixed and a relative position between the user and the information processing apparatus may vary. The present embodiment performs appropriate recognition processing even in such a case.

An exemplary embodiment provides a portable information processing apparatus including an image pick-up portion, a recognition module recognizing a detection target including at least a part of a user within an image obtained by the image pick-up portion and outputting change over time in position of recognition of the detection target, a processing module performing processing in accordance with change over time in position of recognition of the detection target, and a correction module correcting change over time in position of the detection target output from the recognition module, in accordance with change in posture of the information processing apparatus.

In the exemplary embodiment, the information processing apparatus may further include a detection portion detecting change in posture of the information processing apparatus.

In the exemplary embodiment, the detection portion may include a gyro sensor.

In the exemplary embodiment, the correction module may correct change over time in position of the detection target when a value detected by the detection portion satisfies a predetermined condition.

In the exemplary embodiment, the correction module may correct change over time in position of the detection target with an amount of change with a reference posture which is taken when recognition of the detection target by the recognition module is started.

An exemplary embodiment provides a non-transitory storage medium encoded with a computer readable information processing program executed by a portable information processing apparatus. The information processing apparatus includes an image pick-up portion. The information processing program causes the information processing apparatus to perform the steps of recognizing a detection target including at least a part of a user within an image obtained by the image pick-up portion and outputting change over time in position of recognition of the detection target, performing processing in accordance with change over time in position of recognition of the detection target, and correcting the output change over time in position of the detection target in accordance with change in posture of the information processing apparatus.

An exemplary embodiment provides an information processing system including a portable information processing apparatus. The information processing system includes an image pick-up portion and a processor executing an information processing program. The processor implements, by executing the information processing program, a recognition module recognizing a detection target including at least a part of a user within an image obtained by the image pick-up portion and outputting change over time in position of recognition of the detection target, a processing module performing processing in accordance with change over time in position of recognition of the detection target, and a correction module correcting change over time in position of the detection target output from the recognition module, in accordance with change in posture of the information processing apparatus.

An exemplary embodiment provides an information processing method performed in a portable information processing apparatus. The information processing apparatus includes an image pick-up portion. The information processing method includes the steps of recognizing a detection target including at least a part of a user within an image obtained by the image pick-up portion and outputting change over time in position of recognition of the detection target, performing processing in accordance with change over time in position of recognition of the detection target, and correcting the output change over time in position of the detection target in accordance with change in posture of the information processing apparatus.

In the exemplary embodiment, the information processing method may further include the step of detecting change in posture of the information processing apparatus.

In the exemplary embodiment, the detecting step may include using a gyro sensor.

In the exemplary embodiment, the correcting step may include the step of correcting change over time in position of the detection target when a value detected by a detection portion satisfies a predetermined condition.

In the exemplary embodiment, the correcting step may include the step of correcting change over time in position of the detection target with an amount of change with a reference posture which is taken when recognition of the detection target is started.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
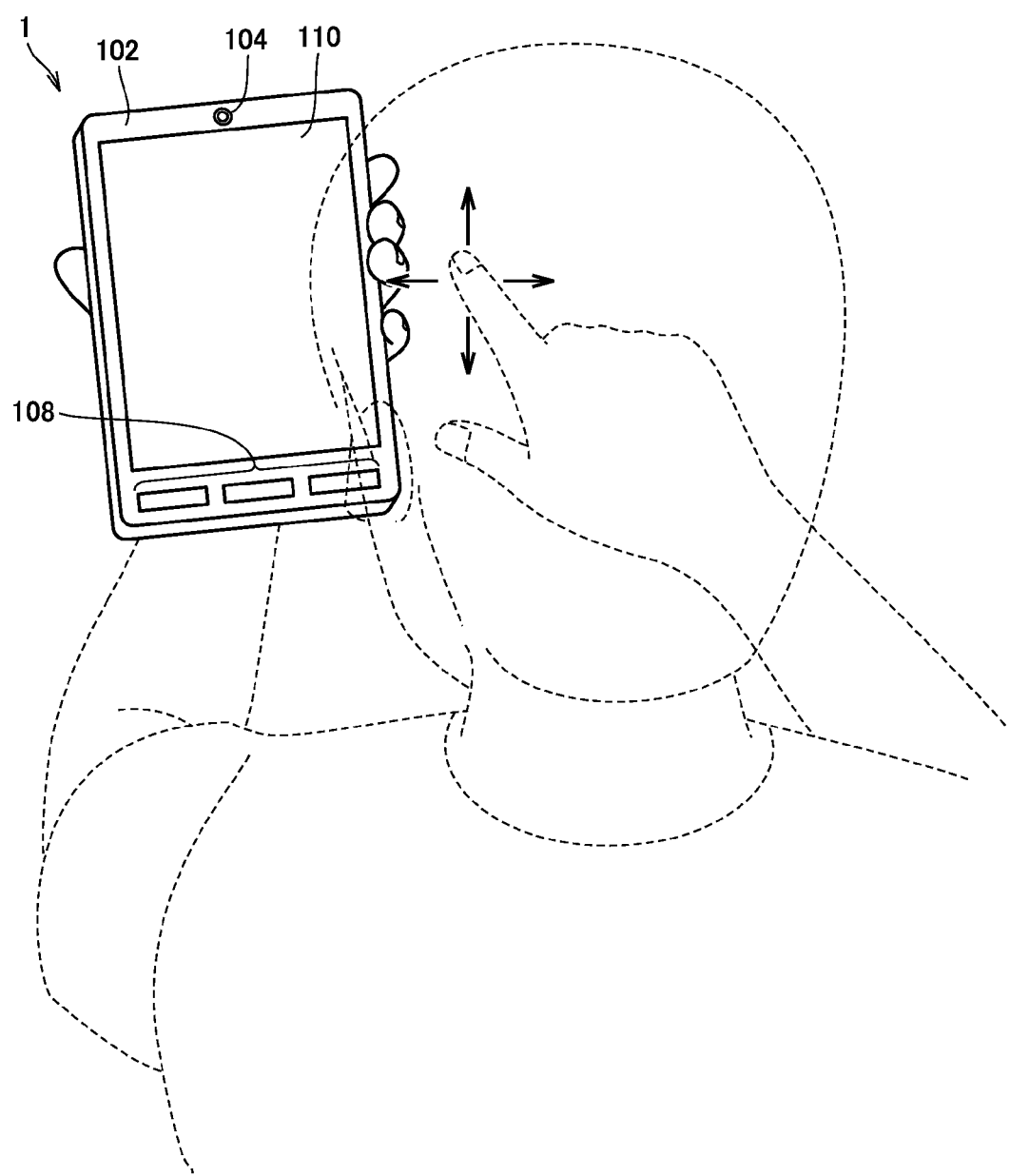
FIG. 1 shows an exemplary illustrative non-limiting drawing illustrating one example of a form of use of a portable terminal according to the present embodiment.

The present embodiment will be described in detail with reference to the drawings. The same or corresponding elements in the drawings have the same reference characters allotted and description thereof will not be repeated.

A portable terminal 1 which is also a computer will be described below as a representative example of portable information processing apparatuses. The portable information processing apparatus is not limited to portable terminal 1, and it can be embodied also as a game device, a portable telephone, a smartphone, a tablet, a phablet, or a personal digital assistant/personal data assistance (PDA). Furthermore, as will be described later, it may be embodied as an information processing system including a storage medium storing a program and a main body device to which the storage medium can be attached.

A part of processing which will be described later may be performed by another device (typically, a server device connected through a network). In such a form of embodiment, for example, an information processing apparatus may perform only processing for accepting an operation from a user or display processing and the server device may perform almost the entire substantial processing.

[A. Form of Use]

A form of use of portable terminal 1 according to the present embodiment will initially be described.

Referring to FIG. 1, portable terminal 1 is a portable computer which can be held by a user even with one hand. Portable terminal 1 includes a housing 102, a display module 110 arranged on a main surface of housing 102, a camera 104 arranged in an upper portion of housing 102, and an input portion 108 arranged in a lower portion of housing 102.

Display module 110 includes a touch panel and the user gives various instructions to portable terminal 1 through an operation onto touch display module 110 in addition to an operation onto input portion 108.

Portable terminal 1 according to the present embodiment has a function to provide an input through what is called a gesture operation in addition to the input function as described above, and the portable terminal can detect movement of the user and can perform processing in accordance with that movement. Movement of the user is determined and detected based on an image picked up by camera 104 (hereinafter also referred to as an "input image"). Camera 104 is what is called an inner camera and corresponds to an image pick-up portion. Camera 104 is preferably arranged to face the user of portable terminal 1. Namely, camera 104 is configured to include in a field of view thereof, at least a part of the user (typically, an upper body including a face) who operates portable terminal 1.

As shown in FIG. 1, in a typical form of use, while the user holds portable terminal 1 with one hand, he/she performs an operation (action) for performing an aimed process with the other hand. An image of this movement made by the other hand of the user is picked up by camera 104 and the operation by the user is detected from the input image obtained during image pick-up. Namely, portable terminal 1 recognizes a detection target including at least a part of the user (a fingertip in the example shown in FIG. 1) within the input image obtained by camera 104 and outputs change over time in position of recognition of the detection target. The detection target may be a position or a contour of the palm or the face, without being limited to the fingertip. By using a face recognition technique, a particular site of a person can be recognized from the input image, or a marker may be attached to a site to be detected so that the marker is recognized.

Portable terminal 1 performs processing in accordance with change over time in position of recognition of the detection target. For example, when the user moves the fingertip upward from a certain position of a point of view, the position of recognition of the fingertip temporally changes upward from the position of the point of view. In accordance with such temporal change in position of recognition (coordinate) (that is, a track of the detection target), such processing as turning a page may be performed in such an application as displaying a document.

[B. Problem and Overview]

Portable terminal 1 according to the present embodiment recognizes a state or an operation (a gesture) of the entire body or a part of the body (such as a hand) of the user who operates portable terminal 1 by using various measurement techniques, and performs processing in accordance with a result of recognition.

In such recognition processing, it is essential to pick up an image of a detection target with the image pick-up portion being fixed. In the portable information processing apparatus such as portable terminal 1, however, both of the information processing apparatus and the detection target move. Namely, in recognition processing, a relative position between the information processing apparatus (that is, the image pick-up portion) and the detection target is to be detected, however, if the information processing apparatus moves in spite of absence of movement of the detection target, the detection target is regarded as having been moved. Namely, the portable information processing apparatus in which movement or hand movement takes place is not suitable for recognition processing. Such a problem will be described in further detail with reference to FIGS. 2A, 2B, and 3A to 3D.

Figure 2A:
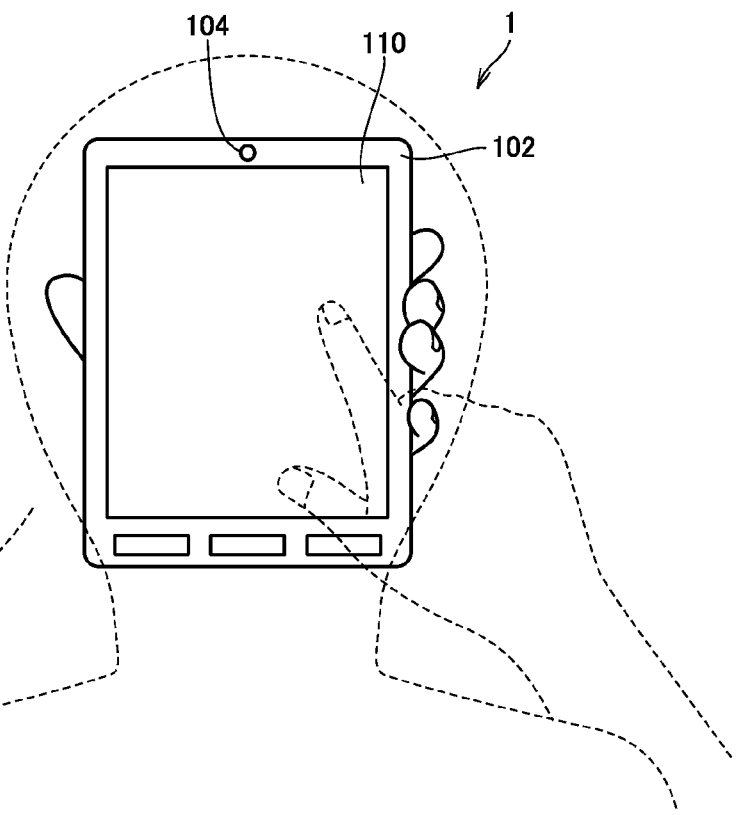
FIGS. 2A and 2B each show an exemplary illustrative non-limiting drawing illustrating another example of a form of use of the portable terminal according to the present embodiment.
Figure 2B:
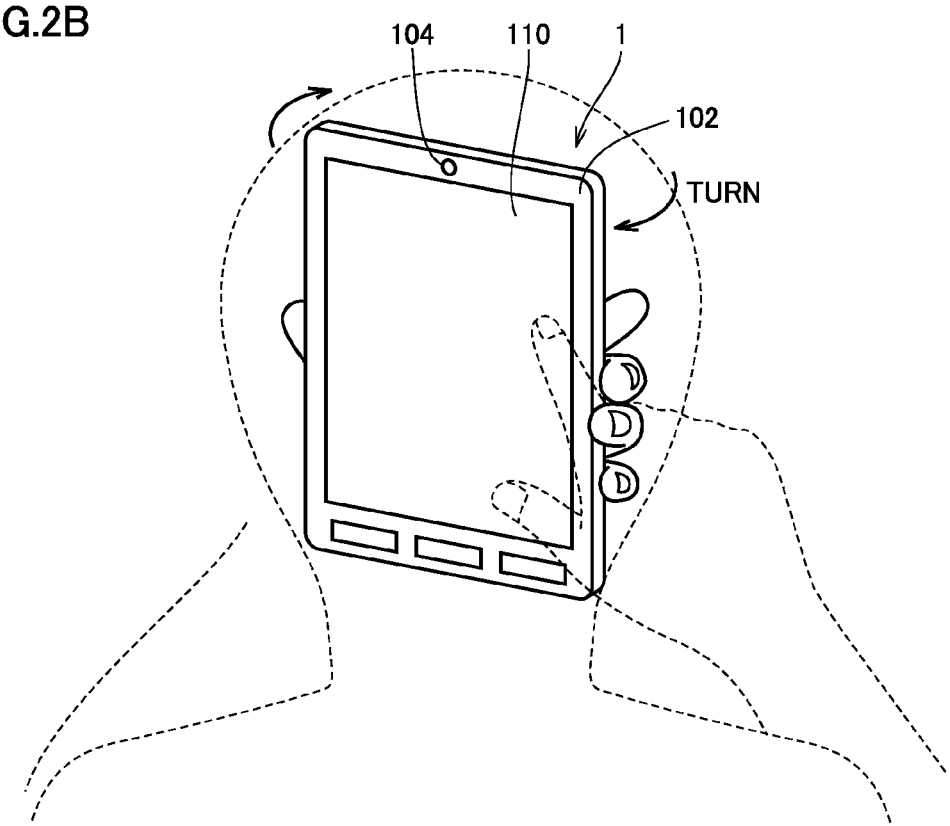

FIG. 2A shows a state that the user holds portable terminal 1 with one hand and performs a gesture operation with the other hand. FIG. 2B shows a state that portable terminal 1 has turned for some reason while the user performs such a gesture operation. When the state in FIG. 2A and the state in FIG. 2B are compared with each other, a direction in which portable terminal 1 faces has varied although a position where the user stands has not varied, and a position of the fingertip of the user which can be viewed from portable terminal 1 varies. FIGS. 3A to 3D schematically show such change in relative position between portable terminal 1 and the user.

Figure 3D:
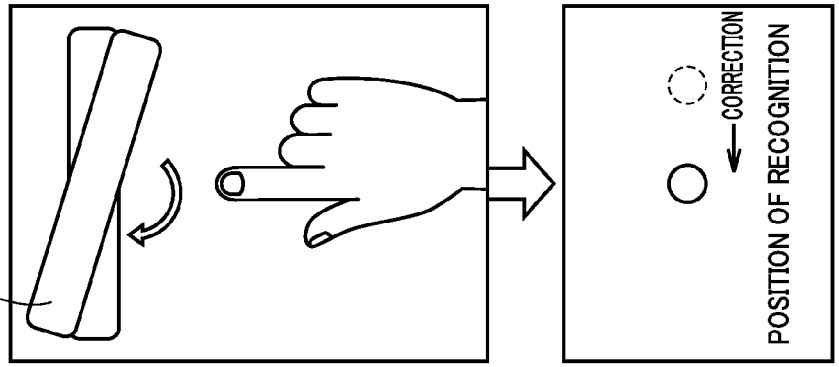
FIGS. 3A to 3D each show an exemplary illustrative non-limiting drawing illustrating a state of erroneous recognition in conventional recognition processing.
Figure 3C:
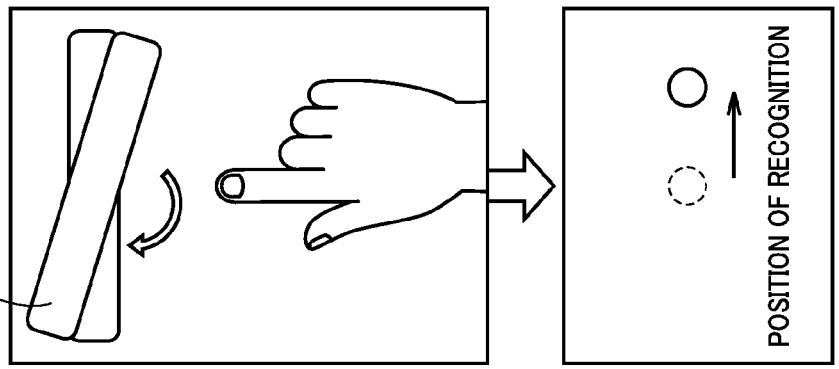
Figure 3B:
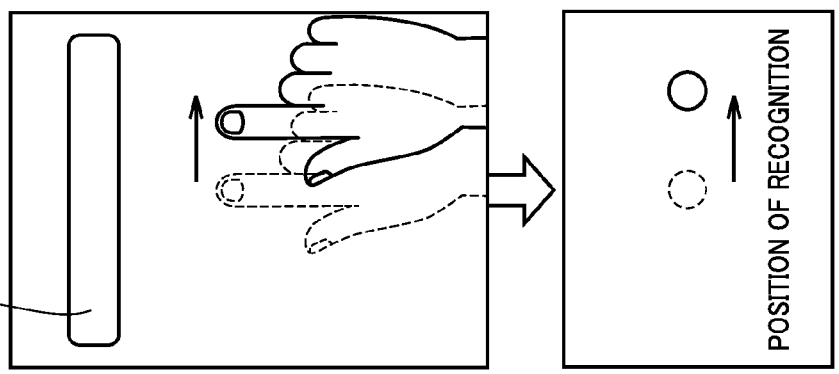
Figure 3A:
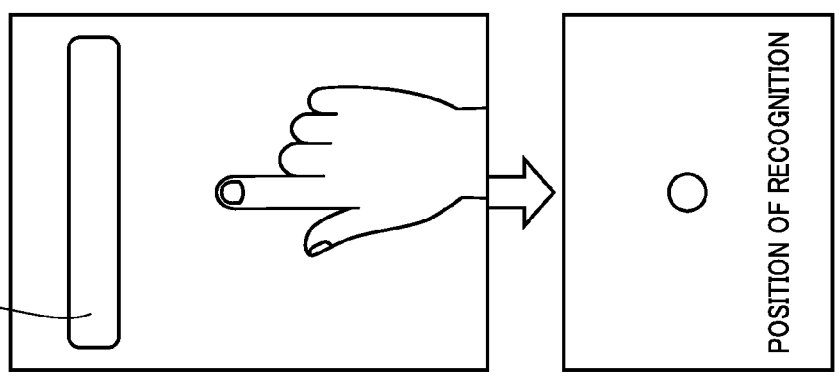

FIG. 3A shows a state that the fingertip of the user facing portable terminal 1 is detected and a substantially central portion of the input image has been determined as the position of recognition. FIG. 3B shows a state that the user facing portable terminal 1 moves the fingertip to the right of the sheet surface and the position of recognition within the input image moves with such movement, from substantially the central portion to the right of the sheet surface. Namely, after recognition processing started, when portable terminal 1 has not moved and when the fingertip to be detected has not moved, the position of recognition is maintained at an initial position as it is (in this example, the central portion in the input image). When the fingertip moves, change in position of recognition is output in response thereto.

FIG. 3C shows a state that portable terminal 1 has turned while the fingertip to be detected remains stationary. In such a case, in recognition processing according to the conventional technique, which of portable terminal 1 and the detection target has moved is not successively distinguished and consequently the position of recognition in the input image will move. In the example shown in FIG. 3C, when portable terminal 1 is tilted to the left of the sheet surface, such erroneous recognition is made that the fingertip which has not moved has moved to the right of the sheet surface.

In contrast, as shown in FIG. 3D, portable terminal 1 according to the present embodiment detects movement of portable terminal 1 and corrects the position of recognition in accordance with detected movement. In the example shown in FIG. 3D, the position of recognition is corrected to the left of the sheet surface in response to turning of portable terminal 1 to the right. Thus, the possibility of such erroneous recognition that the fingertip of the user which has not actually moved "has moved" can be lowered. Thus, portable terminal 1 according to the present embodiment has a correction function to correct change over time in position of the detection target output from recognition means, in accordance with change in posture of the terminal itself. Namely, portable terminal 1 adequately determines whether change in output position of recognition has been caused by actual movement of the detection target or by movement of portable terminal 1 itself, and corrects the output position of recognition in the latter case.

A "posture" of portable terminal 1 herein is a term paying attention to change in range of a field of view of camera 104 mounted on portable terminal 1, and refers to a concept including at least one of an orientation (an angle) in which portable terminal 1 faces and a position of portable terminal 1. Though change in posture of portable terminal 1 can be obtained with various methods as will be described later, a gyro sensor is typically employed.

As explained above, portable terminal 1 according to the present embodiment can lessen erroneous recognition of a gesture operation even though the terminal itself moves or hand movement takes place.

[C. Device Configuration]

A device configuration of portable terminal 1 according to the present embodiment will now be described.

Figure 4:
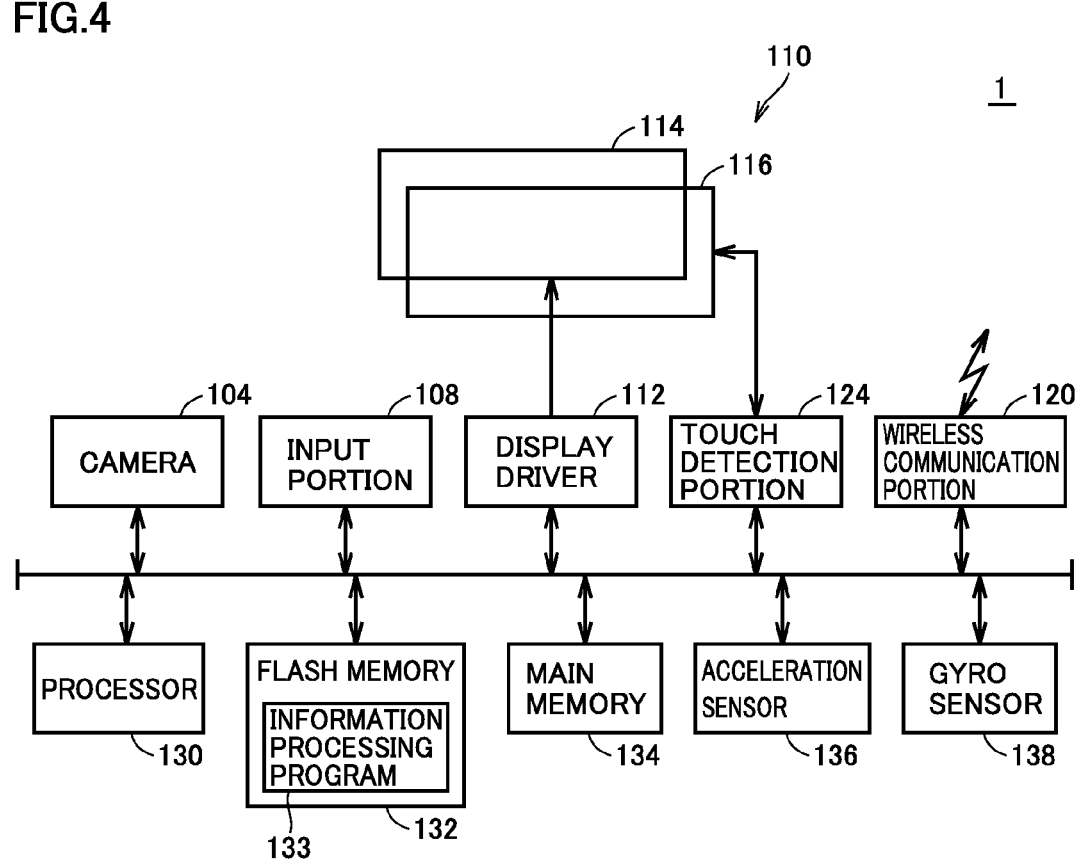
FIG. 4 shows an exemplary illustrative non-limiting drawing illustrating a block diagram showing a device configuration of the portable terminal according to the present embodiment.

Referring to FIGS. 1 and 4, portable terminal 1 includes, as main components, camera 104, input portion 108, display module 110, a display driver 112, a wireless communication portion 120, a touch detection portion 124, a processor 130, a flash memory 132, a main memory 134, an acceleration sensor 136, and a gyro sensor 138.

Display module 110 includes an LCD panel 114 and a touch panel 116.

LCD panel 114 is a display portion displaying an image to a user and includes a group of pixels arranged in matrix and a backlight arranged on a rear surface side of the group of pixels.

Touch panel 116 is attached to cover a surface of LCD panel 114, and detects an input operation (a position indication operation and a pointing operation) by a user and outputs a corresponding two-dimensional coordinate value. A resistive touch panel or a pressure-sensitive touch panel may be adopted as touch panel 116.

Display driver 112 drives LCD panel 114 in response to a command from processor 130.

Wireless communication portion 120 communicates with another apparatus through any wireless means (wireless LAN, Bluetooth®, public lines, or near field communication).

Touch detection portion 124 is connected to touch panel 116 and detects an operation onto touch panel 116 by a user.

Processor 130 reads a program stored in flash memory 132 (an operating system (OS), a system program, or various applications (including an information processing program 133)), has the program developed on main memory 134, and then executes the program. Thus, processing as described below is implemented.

Acceleration sensor 136 detects an acceleration generated in portable terminal 1 and outputs a result of detection to processor 130. Gyro sensor 138 detects an inclination of portable terminal 1 and outputs a result of detection to processor 130.

[D. Processing Procedure]

A processing procedure in recognition processing performed in portable terminal 1 according to the present embodiment will now be described with reference to FIG. 5.

Figure 5:
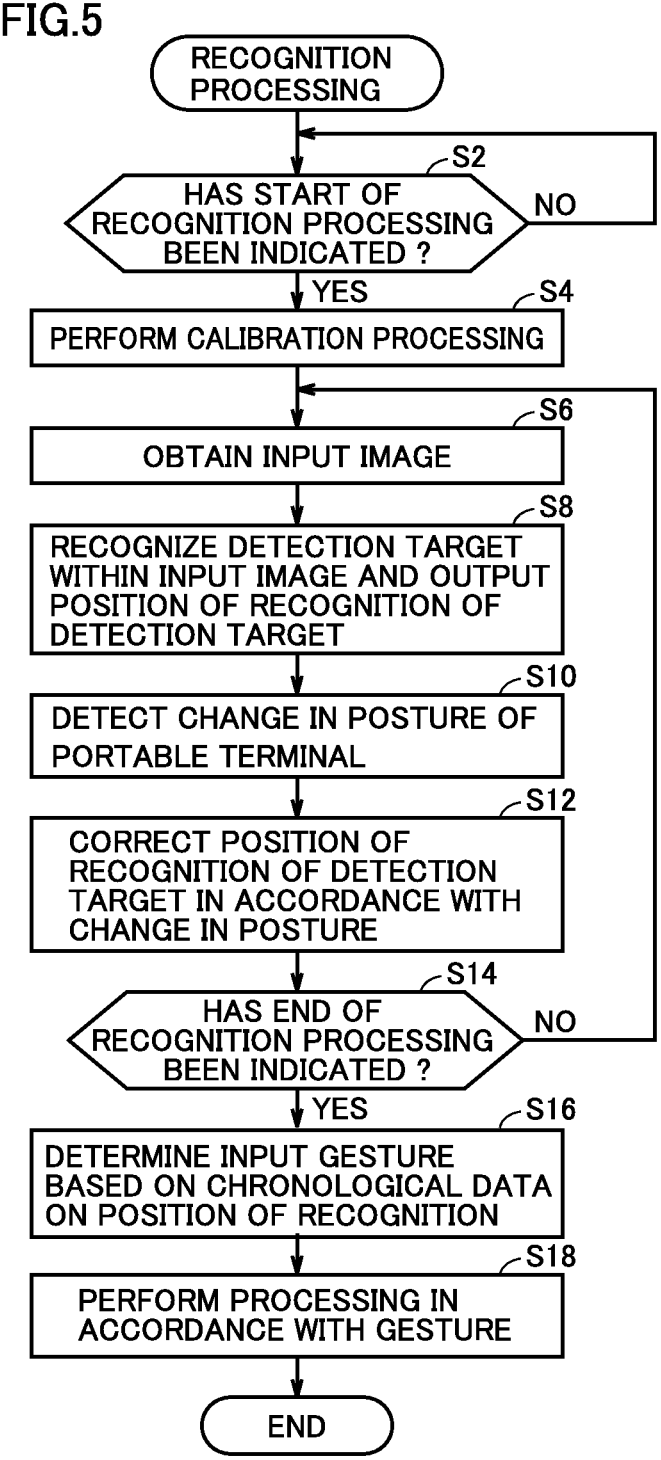
FIG. 5 shows an exemplary illustrative non-limiting drawing illustrating a flowchart showing a processing procedure in recognition processing performed in the portable terminal according to the present embodiment.

Each step shown in FIG. 5 is typically implemented as processor 130 executes information processing program 133 stored in flash memory 132.

Referring to FIG. 5, portable terminal 1 determines whether or not start of recognition processing has been indicated (step S2). An instruction to start recognition processing may explicitly or implicitly be provided by a user or may internally be provided from any application executed by portable terminal 1. Processing in step S2 is repeated until start of the recognition processing is indicated.

When start of the recognition processing is indicated (YES in step S2), portable terminal 1 performs calibration processing (step S4). The calibration processing is processing for registering in advance a detection target. For example, while an image obtained as a result of image pick-up by camera 104 (a real time image) is displayed on display module 110, a frame for positioning a portion to be detected is displayed as being overlaid on the image (FIG. 1). Concurrently, a message that "make adjustment such that the detection target is accommodated in the frame" is displayed. The user adjusts a position relative to portable terminal 1 such that the portion to be detected (for example, the fingertip) is accommodated in the frame displayed on a screen. The user selects an enter button in that state. Then, a partial image within the frame is registered as the detection target.

The calibration processing shown in step S4 may be performed in advance, or such a form that the user makes selection from a pre-set list may be adopted.

When the calibration processing is completed, recognition processing below is started. Namely, portable terminal 1 picks up an image of a subject included in a field of view of camera 104 with the use of camera 104 and obtains an input image (step S6). In succession, portable terminal 1 recognizes the detection target in the input image and outputs a position of recognition of the detection target (step S8).

In succession, portable terminal 1 detects change in posture of portable terminal 1 (step S10), and corrects the position of recognition of the detection target output from recognition means in accordance with detected change in posture (step S12). Unless the position of portable terminal 1 has changed, the position of recognition of the detection target is not corrected in step S12 and the position of recognition is output as it is detected in step S8.

In succession, portable terminal 1 determines whether or not end of the recognition processing has been indicated (step S14). An instruction to quit the recognition processing may explicitly or implicitly be provided by the user or may internally be provided from any application executed by portable terminal 1. Alternatively, the recognition processing may automatically end after a predetermined period has elapsed since start of the recognition processing. When end of the recognition processing has not been indicated (NO in step S14), processing in step S6 or later is repeated.

When end of the recognition processing has been indicated (YES in step S14), portable terminal 1 determines an input gesture based on chronological data on the positions of recognition obtained through repetition of preceding steps S6 to S14 (step S16). Processing in accordance with this determined gesture is performed (step S18). Then, the process ends.

[E. Correction Processing]

Figure 6:
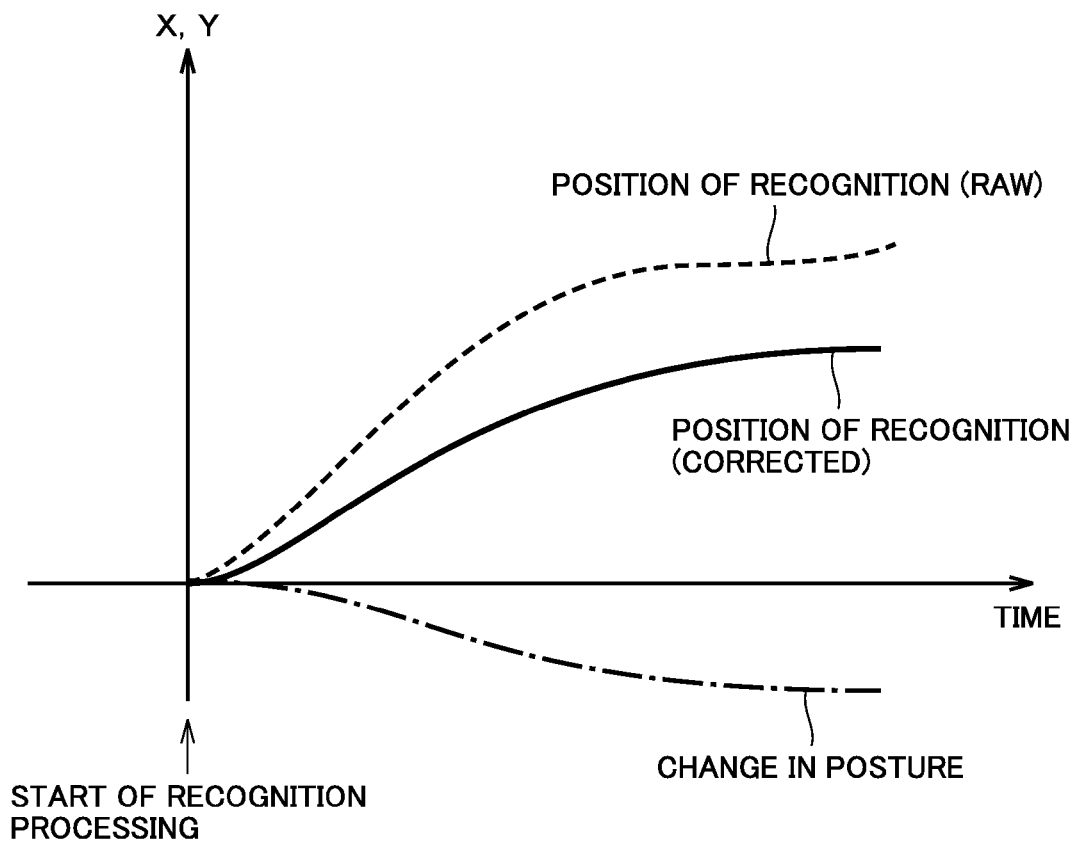
FIG. 6 shows an exemplary illustrative non-limiting drawing illustrating processing for correcting a position of recognition included in the recognition processing performed in the portable terminal according to the present embodiment.

Processing for correcting a position of recognition (steps S8 to S12 in FIG. 5) which is included in the recognition processing performed in portable terminal 1 according to the present embodiment will now be described. FIG. 6 is a schematic diagram illustrating processing for correcting a position of recognition, which is included in the recognition processing performed in portable terminal 1 according to the present embodiment. The ordinate in FIG. 6 represents a value calculated by converting an amount of displacement of a detection target in an input image into a one-dimensional amount and the abscissa in FIG. 6 represents time.

Referring to FIG. 6, a detection target within an input image picked up by camera 104 is recognized and a position of recognition (raw) of the detection target is output. In parallel to this output of the position of recognition of the detection target, change in posture of portable terminal 1 is also detected. A deviation with a position at the time of start of the recognition processing being defined as the reference is output as change in posture of portable terminal 1. This output deviation is given a value such that a sign is opposite to that of a direction of output of the position of recognition. Finally, the sum of the output of the position of recognition of the detection target and change in posture of portable terminal 1 is output as a value for correction of the position of recognition. In other words, a value calculated by subtracting change in posture of portable terminal 1 from the output of the position of recognition of the detection target is adopted as the value for correcting the position of recognition. As shown in FIG. 6, in the correction processing, an amount of change with a reference posture which is taken when recognition of the detection target is started is used to correct change over time in position of the detection target.

Since change in posture of portable terminal 1 corresponds to displacement of a field of view of portable terminal 1, an amount of displacement since start of recognition processing (the total sum of displacement) is added/subtracted in each operation cycle.

Thus, portable terminal 1 performing recognition processing incorporates a function to detect change in posture thereof so that change over time in posture of portable terminal 1 is obtained. As variation in posture is added to the position of recognition of the detection target so as to cancel the variation, erroneous recognition about a gesture operation performed by the user can be lessened even though portable terminal 1 has moved.

[F. Functional Configuration]

A functional configuration for implementing the recognition processing of portable terminal 1 according to the present embodiment will now be described with reference to FIG. 7.

Figure 7:
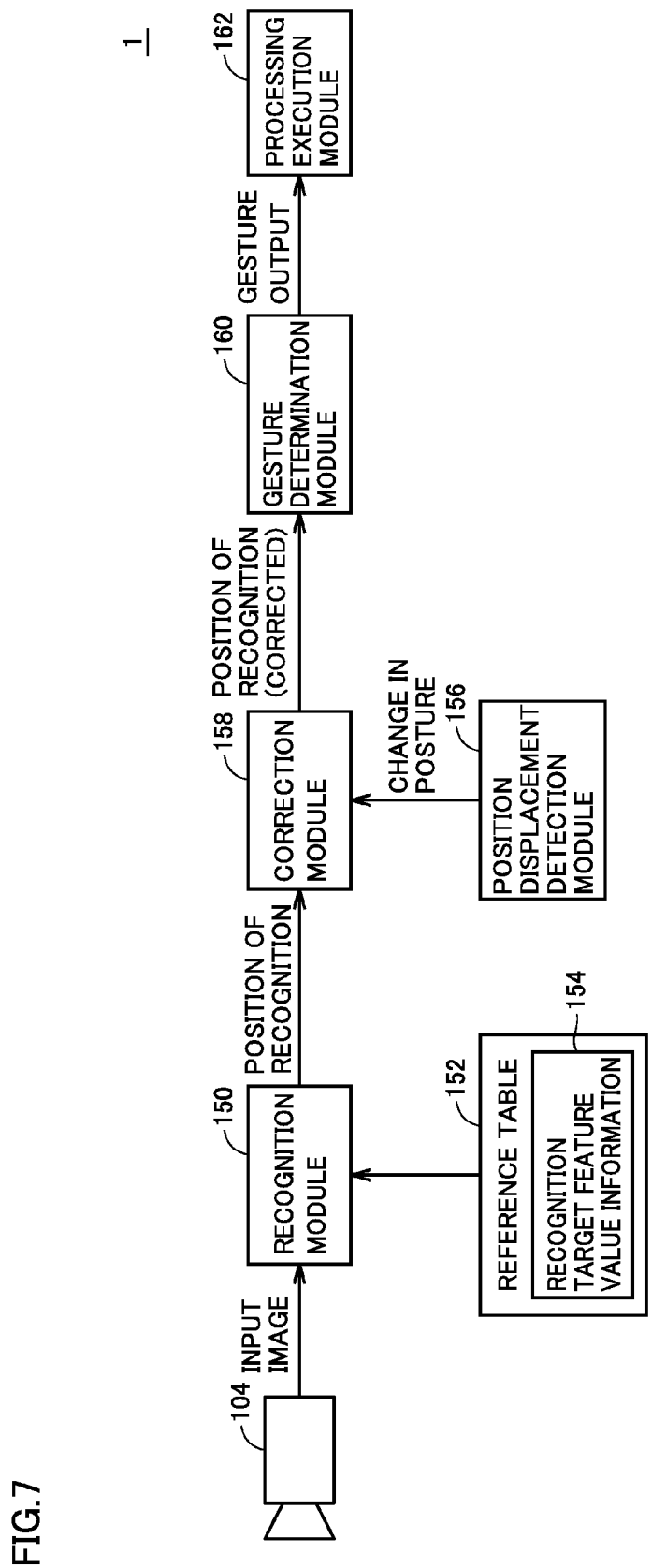
FIG. 7 shows an exemplary illustrative non-limiting drawing illustrating a functional configuration for implementing the recognition processing of the portable terminal according to the present embodiment.

Each module shown in FIG. 7 is typically provided by a hardware module and information processing program 133 stored in flash memory 132. All or some of modules shown in FIG. 7 may be mounted with the use of such a hardware circuit as an application specific integrated circuit (ASIC) or a field-programmable gate array (FPGA).

Referring to FIG. 7, portable terminal 1 according to the present embodiment includes, as its functional configuration, a recognition module 150, a reference table 152, a correction module 158, a position displacement detection module 156, a gesture determination module 160, and a processing execution module 162.

When the recognition processing is started, an input image generated as a result of image pick-up by camera 104 is input to recognition module 150. Recognition module 150 recognizes a detection target within the input image and outputs a recognized position of the detection target (a position of recognition) to correction module 158.

In recognition of the detection target, recognition module 150 refers to recognition target feature value information 154 stored in reference table 152. Recognition target feature value information 154 is generated and stored in the calibration processing (step S4 in FIG. 5). Recognition module 150 may recognize the detection target each time an input image is provided, or may output change over time in position of recognition of the detection target by using input images over a plurality of frames (that is, moving images). Thus, recognition module 150 provides such a recognition function to recognize a detection target including at least a part of a user within an input image obtained by camera 104 and to output change over time in position of recognition of the detection target.

Position displacement detection module 156 detects change in posture of portable terminal 1 and outputs a value thereof. Namely, position displacement detection module 156 provides a detection function to detect change in posture of portable terminal 1. Any means which can be implemented with hardware and software can be adopted as position displacement detection module 156. Typically, position displacement detection module 156 includes gyro sensor 138 (FIG. 4).

Typically, position displacement detection module 156 detects a posture of portable terminal 1 by using a detection value (yaw, pitch, and roll) from gyro sensor 138 (FIG. 4). Alternatively, a posture of portable terminal 1 may be detected by using acceleration sensor 136 (FIG. 4) or by combining acceleration sensor 136 and gyro sensor 138. In this case, a sensor capable of detection in multiple axes is employed as acceleration sensor 136.

Correction processing requires an amount of displacement (the total sum of displacement) since start of the recognition processing. Therefore, when various sensors detect a posture of portable terminal 1, pre-processing in accordance therewith should be performed. For example, when an angular velocity is to be output, an amount of displacement in angle should be calculated through time integration in one stage, and when an angular acceleration is to be output, an amount of displacement in angle should be calculated through time integration in two stages. Alternatively, when an amount of displacement with each axis being defined as the center is output from various sensors, the amount of displacement should be converted to an amount of displacement within an input image. This conversion is made by using an amount of displacement in detected angle and a viewing angle of camera 104.

Alternatively, position displacement detection module 156 detects a posture of portable terminal 1 with an image processing technique. For example, a posture of portable terminal 1 may be detected by separating a detection target and a background from an input image picked up at the time of start of the recognition processing and recognizing a position of the background within a subsequently picked-up input image. In particular, when an object having a relatively large feature value is included in the background, a method using the image processing technique is effective.

Correction module 158 corrects a position of recognition output from recognition module 150 based on information on the posture of portable terminal 1 from position displacement detection module 156, and outputs the corrected position of recognition to gesture determination module 160. When the posture of portable terminal 1 has not changed, the position of recognition output from recognition module 150 is output as it is to gesture determination module 160. The corrected position of recognition from correction module 158 is output each time an input image is input (that is, for each frame). Thus, correction module 158 provides the correction function to correct change over time in position of the detection target output from recognition module 150, in accordance with change in posture of portable terminal 1.

Gesture determination module 160 determines a gesture made by a user based on the corrected position of recognition from correction module 158. Typically, gesture determination module 160 has a plurality of sets of a pattern of position change and a corresponding gesture registered in advance, and determines a gesture with reference to this registered information. Gesture determination module 160 provides the determined gesture to processing execution module 162 as a gesture output.

Processing execution module 162 performs corresponding processing based on the gesture output from gesture determination module 160. A part or the entirety of processing execution module 162 may be mounted on various applications executed in portable terminal 1. For example, when a gesture to move in a lateral direction is made in an application displaying a document, processing for turning a page is performed.

Gesture determination module 160 and processing execution module 162 may integrally be mounted. In this case, individual identification of a gesture is not necessarily required. Namely, change over time in position of a detection target and an executed application or an operation on the application are brought in correspondence with each other in advance, and corresponding processing may be performed in accordance with (corrected) input change over time in position of the detection target.

Thus, gesture determination module 160 and/or processing execution module 162 provide(s) a processing function to perform processing in accordance with change over time in position of recognition of the detection target.

[G. Modification]

In the correction processing described above, processing for correcting, when a posture of portable terminal 1 changes, a position of recognition of a detection target in accordance with the change has been exemplified. Such processing for correcting a position of recognition of a detection target may be performed only when a predetermined condition is satisfied. In other words, when a certain condition is satisfied, a position of recognition does not have to be corrected in spite of change in posture of portable terminal 1. Namely, correction module 158 (FIG. 7) may correct change over time in position of a detection target when a value detected by position displacement detection module 156 satisfies a predetermined condition. Such a processing example in which execution of such correction processing is restricted will be described below.

(g1: Correction Condition 1)

Whether or not information on a posture of portable terminal 1 detected by various sensors such as gyro sensor 138 and acceleration sensor 136 has appropriately been detected may be determined, and a position of recognition output from recognition module 150 may be corrected only when the information has appropriately been detected.

For example, whether or not an amount of change in posture per unit time is within a predetermined range can be employed as a criterion for determining whether or not information on a posture has appropriately been detected. When an amount of change in posture per unit time exceeds the predetermined range, a state that erroneous detection due to introduction of noise has occurred or a state that portable terminal 1 is being carried is assumed. Therefore, in such a case, the position of recognition does not have to be corrected.

Alternatively, whether or not the total sum of amounts of change in posture since start of recognition processing is within a predetermined range can also be employed as another criterion for determining whether or not information on a posture has appropriately been detected. When the total sum of amounts of change in posture since start of recognition processing exceeds the predetermined range, it is assumed that the field of view of portable terminal 1 has greatly deviated from the original range. Therefore, in such a case, the position of recognition does not have to be corrected.

(g2: Correction Condition 2)

In detecting a posture of portable terminal 1 with the image processing technique, whether or not a result of detection is appropriate may be determined, and only when the result is appropriate, a position of recognition output from recognition module 150 may be corrected.

Figure 8A:
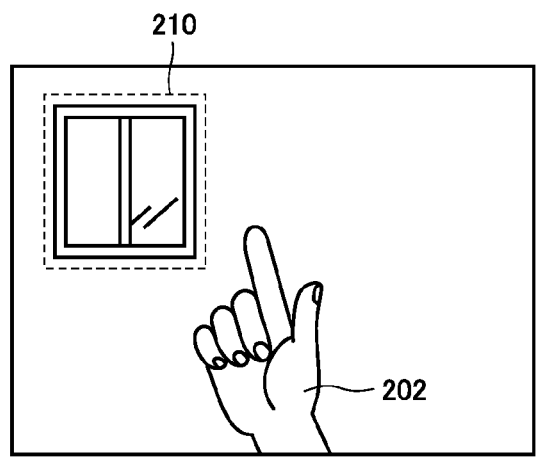
FIGS. 8A to 8C each show an exemplary illustrative non-limiting drawing illustrating a method of detecting change in posture of the portable terminal with the use of an image processing technique performed in the portable terminal according to the present embodiment.

A method of detecting change in posture of portable terminal 1 with the image processing technique performed in portable terminal 1 according to the present embodiment will be described with reference to FIGS. 8A to 8C. FIG. 8A shows one example of an input image picked up by camera 104 at the time of start of recognition processing. In the input image shown in FIG. 8A, in addition to an object 202 of a user's hand, an object 210 of a window in the background is present. In such a case, change in posture of portable terminal 1 is detected from an amount of displacement of object 210, with object 210 being defined as a background object.

Figure 8B:
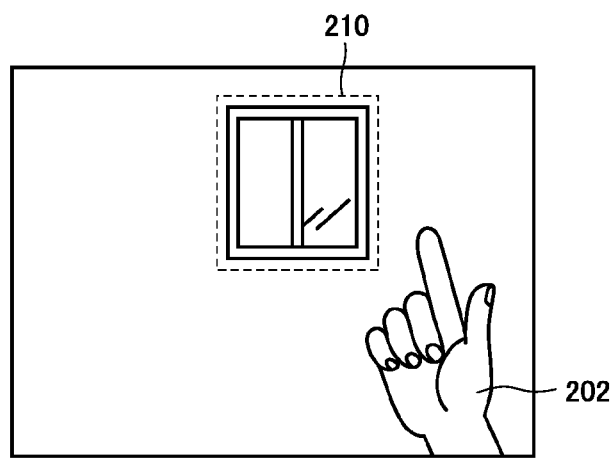

FIG. 8B shows a state that a posture of portable terminal 1 has changed in a lateral direction of the sheet surface from the state shown in FIG. 8A. In the state shown in FIG. 8B, both of object 202 and object 210 have relatively moved to the right of the sheet surface. In such a case, change in posture of portable terminal 1 can appropriately be detected from an amount of movement of object 210. Here, since the same object 210 is searched for before and after change in posture, a value for similarity (a degree of correlation) also becomes higher and it can be determined that likelihood (reliability) is relatively high. In such a case, change over time in position of the detection target is corrected in accordance with detected change in posture of portable terminal 1.

Figure 8C:
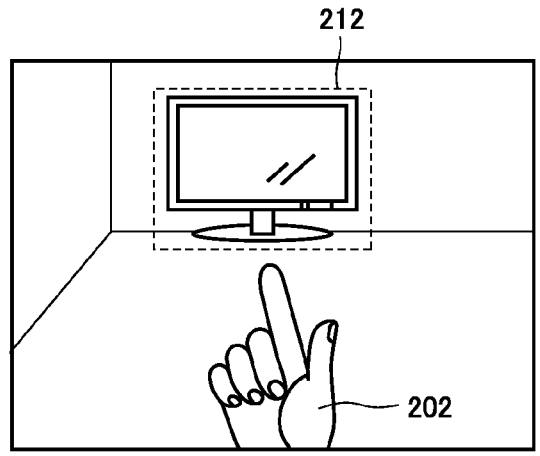

FIG. 8C shows a state that the user has moved with portable terminal 1. In this input image, an object 212 of a television different from object 210 of the window which was present at the time of start of the recognition processing is present. In this case, similarity (a degree of correlation) between object 210 and object 212 is relatively low, and it can be determined that likelihood (reliability) is relatively low. In such a case, change over time in position of the detection target does not have to be corrected.

[H. Conclusion]

Portable terminal 1 according to the present embodiment detects change in posture of the terminal itself with the use of a gyro sensor and corrects recognized change over time in position of a detection target in accordance with that change in posture. By performing such correction processing, even though a user changes an orientation of portable terminal 1 during operation of portable terminal 1, the possibility of erroneous recognition of a gesture operation can be lowered.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A portable information processing apparatus, comprising:
   an image pick-up portion having a sensor capable of acquiring an image;
   a recognition module which utilizes a digital processor configured to recognize a detection target within an acquired image that includes at least a part of a user within the image obtained by the image pick-up portion and to produce a value indicative of change over time in position of recognition of the detection target within the acquired image;
   a processing module which utilizes a digital processor configured to perform processing in accordance with the value indicative of change over time in position of recognition of the detection target; and
   a correction module which utilizes a digital processor configured to correct the value indicative of change over time in position of the detection target produced by the recognition module, in accordance with change in posture of the information processing apparatus.

2. The information processing apparatus according to claim 1, further comprising a detection portion utilizing a digital processor configured to detect change in posture of the information processing apparatus and to produce a value indicative of a change in posture of the information processing system.

3. The information processing apparatus according to claim 2, wherein the detection portion includes a gyro sensor.

4. The information processing apparatus according to claim 2, wherein the correction module is configured to correct change over time in position of the detection target when a value detected by the detection portion satisfies a predetermined condition.

5. The information processing apparatus according to claim 1, wherein the correction module utilizes a digital processor configured to correct the value indicative of change over time in position of the detection target with an amount of change with respect to a reference posture which is taken when recognition of the detection target by the recognition module is started.

6. A non-transitory storage medium encoded with a computer readable information processing program executed by a portable information processing apparatus including an image pick-up portion, the information processing program causing the information processing apparatus to perform functionality comprising:
   recognizing a detection target including at least a part of a user within an image obtained by the image pick-up portion and producing a value indicative of change over time in position of recognition of the detection target within the obtained image;
   performing processing in accordance with the value indicative of change over time in position of recognition of the detection target; and
   correcting the value indicative of change over time in position of the detection target in accordance with change in posture of the information processing apparatus.

7. An information processing system including a portable information processing apparatus, comprising:
   an image pick-up portion having a sensor capable of acquiring an image;
   a computer processor adapted to execute an information processing program, the processor implementing, by executing the information processing program, a recognition module configured to recognize a detection target within an acquired image that includes at least a part of a user within the image obtained by the image pick-up portion and to identify a position of the detection target within the image at the time of recognition and produce a value indicative of a change over time in position of the detection target with respect to the position of the detection target at the time of recognition;
   a processing module which utilizes the computer processor to perform processing in accordance with the value indicative of change over time in position of recognition of the detection target; and
   a correction module which utilizes the computer processor to correct the value indicative of change over time in position of the detection target in accordance with a change in posture of the information processing apparatus.

8. An information processing method performed in a portable information processing apparatus including an image pick-up portion, comprising:
   recognizing a detection target including at least a part of a user within an image obtained by the image pick-up portion and producing a value indicative of change over time in position of recognition of the detection target within the obtained image;

performing processing in accordance with the value indicative of change over time in position of recognition of the detection target; and correcting the value indicative of change over time in position of the detection target in accordance with change in posture of the information processing apparatus.

* * * * *